United States Patent [19]

Prange et al.

[11] Patent Number: 4,489,870

[45] Date of Patent: Dec. 25, 1984

[54] APPARATUS FOR SEVERING EDGES OF A GLASS SHEET

[75] Inventors: Bernard H. Prange; Dale J. Helenschmidt, both of Burkburnett, Tex.

[73] Assignee: PPG Industries, Inc., Pittsburgh, Pa.

[21] Appl. No.: 411,195

[22] Filed: Aug. 25, 1982

[51] Int. Cl.³ .............................................. C03B 33/02
[52] U.S. Cl. ...................................... 225/2; 225/96.5
[58] Field of Search ................................... 225/2, 96.5

[56] References Cited

U.S. PATENT DOCUMENTS

| | | | |
|---|---|---|---|
| 2,948,991 | 8/1960 | Walters et al. | 225/96.5 |
| 3,244,337 | 4/1966 | Curtze et al. | 225/2 |
| 3,268,135 | 8/1966 | Barradell-Smith | 225/2 |
| 3,303,980 | 2/1967 | Offenbacher | 225/2 |
| 3,592,370 | 7/1971 | Boardman | 225/96.5 X |
| 3,779,437 | 12/1973 | Yamamoto et al. | 225/96.5 |
| 3,800,991 | 4/1974 | Grove et al. | 225/2 |
| 3,865,293 | 2/1975 | Ernsberger et al. | 225/2 |
| 3,865,294 | 2/1975 | Ernsberger et al. | 225/2 |
| 3,998,616 | 12/1976 | Farabaugh | 65/29 |
| 4,004,723 | 1/1977 | Kabanov et al. | 225/96.5 X |
| 4,049,167 | 9/1977 | Guissard | 225/2 |
| 4,109,841 | 8/1978 | DeTorre | 225/96.5 |
| 4,136,807 | 1/1979 | DeTorre | 225/2 |
| 4,285,451 | 8/1981 | Ferraino | 225/2 |
| 4,306,672 | 12/1981 | Johannes | 225/96.5 X |

*Primary Examiner*—Frank T. Yost
*Attorney, Agent, or Firm*—Robert A. Westerlund, Jr.; Donald Carl Lepiane

[57] ABSTRACT

Bulb edges are severed from a glass sheet. At least one score is imposed along and adjacent to the bulb edge, and the scores are sequentially opened by mechanically running the score. A pair of powered and jointly actuated, simultaneously moving cylindrical mandrels apply torque about the trailing end of the score line to sever the sheet. The lower mandrel moves in an upward direction beneath the sheet while the upper mandrel moves through an arcuate path down and toward the bulb edge. A method of severing bulb edges from a glass sheet is also disclosed in which the scores are opened by applying torque about the score line on the upper and lower edges of the trailing end of a glass sheet.

22 Claims, 8 Drawing Figures

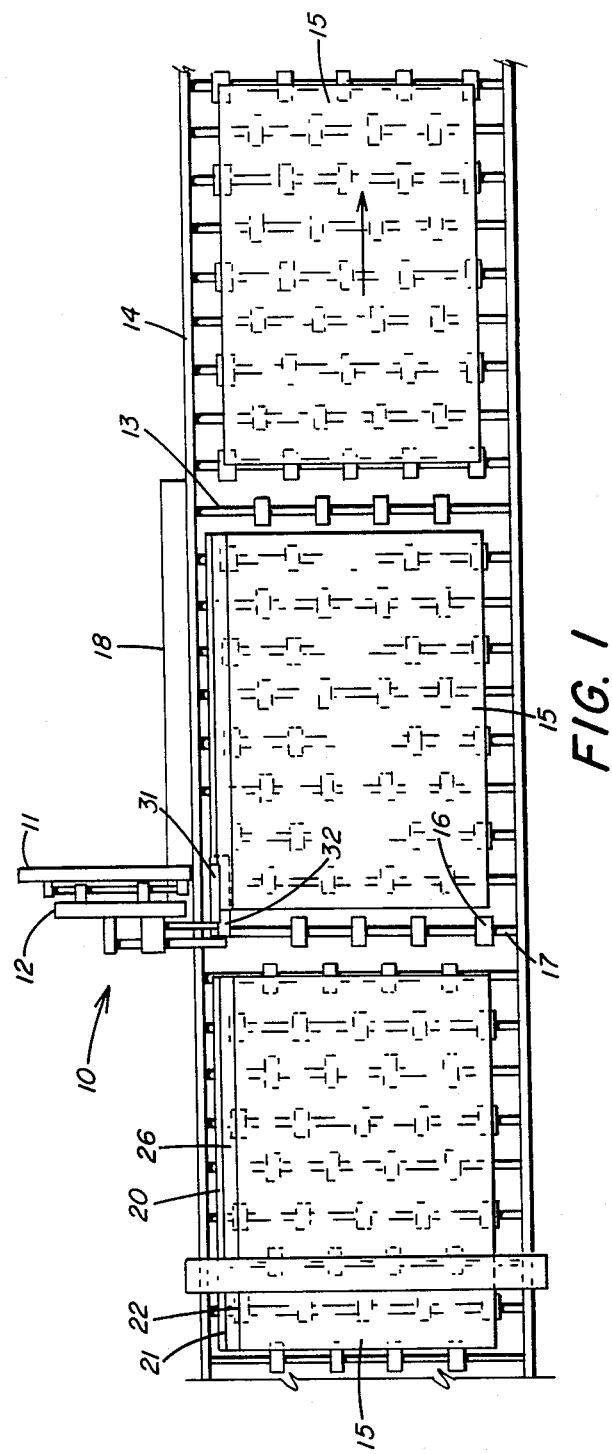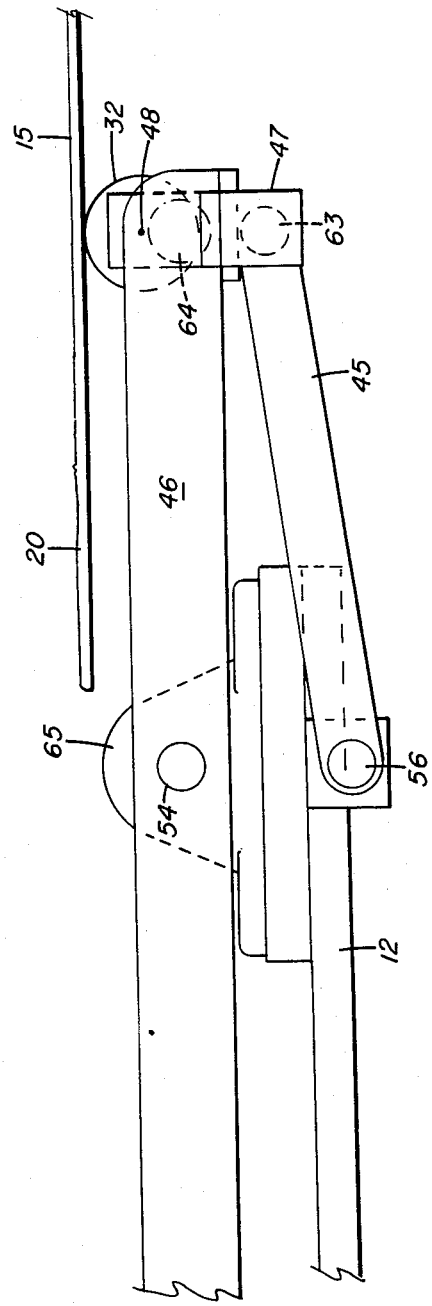

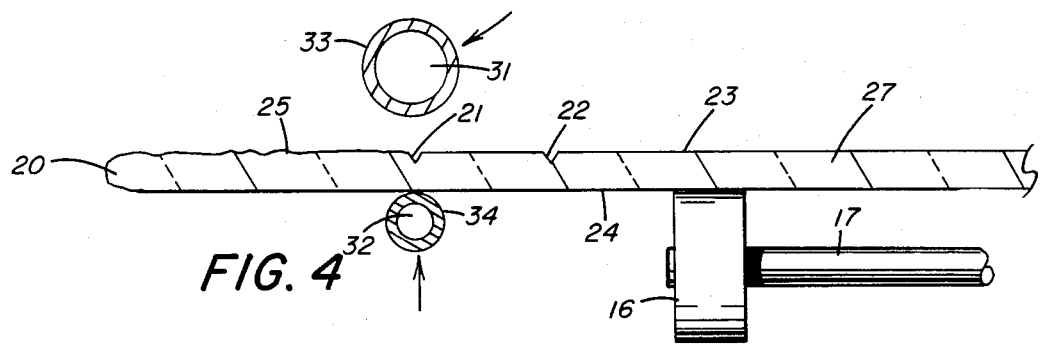
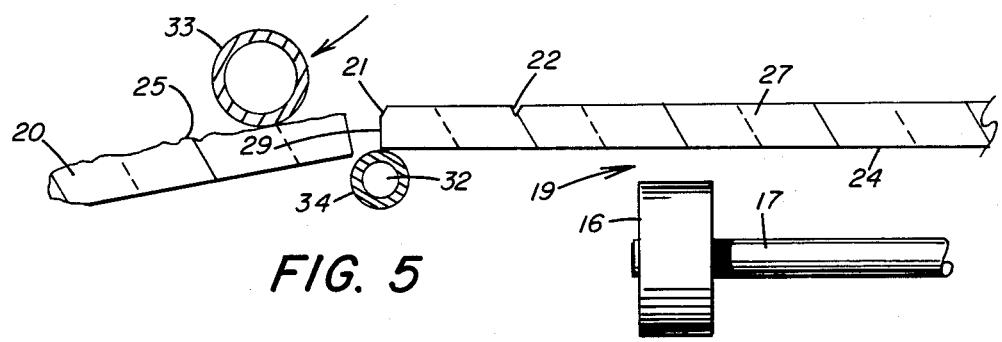
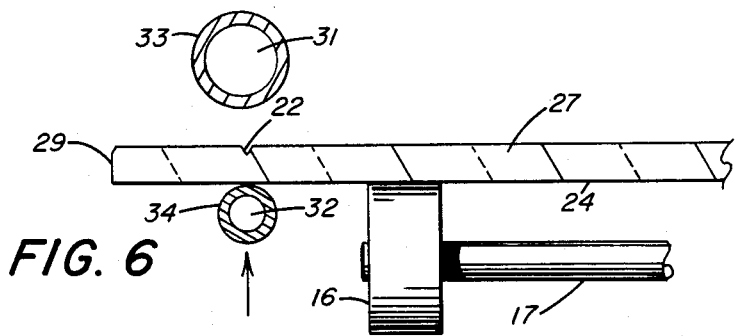
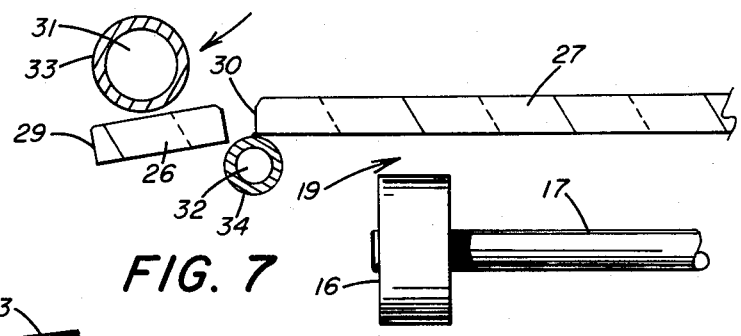
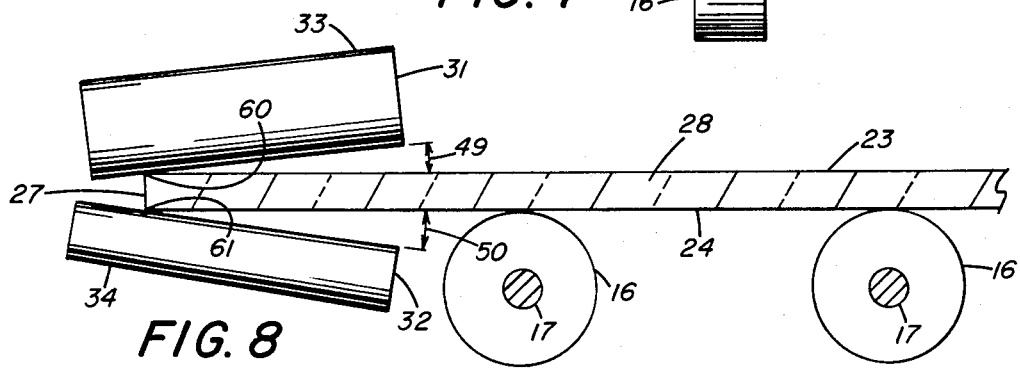

APPARATUS FOR SEVERING EDGES OF A GLASS SHEET

BACKGROUND OF THE INVENTION

1. The Field of the Invention

This invention relates to a method and apparatus for severing a sheet of refractory material and, more particularly, to sever the bulb edges of a sheet cut from a continuous glass ribbon.

2. Discussions of the Technical Difficulty

As taught in U.S. Pat. No. 3,998,616 in the manufacture of glass ribbon by the float method, a continuous ribbon of molten glass is controllably cooled as it moves through a forming chamber on a pool of molten metal. The edges of the molten glass are engaged by attenuating machines as the glass cools. The attenuating machines move the edges relative to one another to provide a dimensionally stable glass ribbon having a thickness other than equilibrium thickness. After sequentially exiting the forming chamber and annealing lehr, the glass ribbon is cut into sections normally called "lehr ends" or "caps". Since the outside edges of the lehr ends are deformed by earlier contact with the attenuating machines, the outermost portion known as "bulb edges" are not usable and must be removed.

It is known that the bulb edges to be removed can be scored at a scoring station where a score is imposed on the upper surface of the glass sheet adjacent to each of the bulb edges. Thereafter the prescored lehr end is momentarily halted at an edge snap roll in which a rigid member positioned above and along the bulb edge moves downward to snap the bulb edge from the lehr end. The glass sheet is supported by the conveyor.

In U.S. Pat. No. 3,303,980 an edge snapping device is disclosed in which an anvil is engaged with one surface (lower) of the glass sheet and a striker is engageable with the opposite (upper) surface of the sheet to provide an edge snap.

U.S. Pat. No. 3,779,437 discloses an edge cutting device which includes at least two cutter means and a breaking means.

U.S. Pat. No. 4,049,167 discloses a process for removing edge portions from a glass sheet in which a previously applied score line is hammered on the opposite side of the score and a bending force is applied to the sheet to initiate breakage.

In U.S. Pat. No. 4,285,451 a method and an apparatus for severing edges of a glass sheet is disclosed in which the surface of a resilient member lying in a plane subtending an oblique angle with the sheet is moved downward against the bulb edge to sequentially sever the bulb edge at a first and second score line previously applied.

U.S. Pat. No. 3,268,135 discloses a method and apparatus for snapping sheets of glass by applying a curvature on the sheet.

U.S. Pat. Nos. 4,109,841 and 4,136,807 disclose a method and apparatus for opening score lines in glass sheets by snapping the score with a bending moment applied to the glass sheet along a path transverse to the article movement path.

One of the problems associated with snapping the bulb edge portions along a score line is that the edge produced has defects, including serration hackle, chips, deep sharks teeth, flare and bevel, especially in glass sheets having a thickness greater than 5 mm. Although many automated bulb edge snapping machines do work well enough with thinner glass, the best edges on thicker glass sheets are obtained by hand cutting in which a score line is "run" to open the score by applying a bending moment to one end of the score line. Unfortunately, the use of hand cutting techniques on the main line of an automated float plant to sever bulb edges is not feasible. Accordingly, an apparatus is needed that will provide a good clean edge on lehr ends even on thicknesses of glass above 5 mm. The resultant edge should be of the quality of hand cutting techniques and yet be fully automated and capable of high speed operation with a quick recycling time. The instant invention is directed toward those needs.

SUMMARY OF THE INVENTION

This invention relates to a method and apparatus of severing a refractory material having a pair of opposed surfaces, for example, lehr ends having bulb edges. The apparatus provides for twisting the trailing edge about previously applied score lines by the use of a pair of mandrels. A lower mandrel placed beneath the sheet raises the edge of the sheet in contact with the trailing edge. The contact is made at a slight angle, thus engaging the bottom corner of the trailing edge of the lehr end. The edge being thus slightly raised whereupon an upper mandrel moving in a arcuate path having a downward vertical component as well as a horizontal edgewise component contacts the glass at the upper corner of the trailing end. The peeling or twisting movement of the mandrels "peels" or "runs" the score to open the score, thus severing the bulb edge from the lehr end.

In order to improve upon the quality of the severed edge, it has been found desirable to repeat the bulb edge removal sequence along a second score line parallel and inbound of the first score. The mandrels in the same relative position are moved toward the glass sheet so that the lower mandrel is placed under the second score. The second glass strip is then removed in the same manner as the initial bulb edge. This second cut or "money" cut, is of a finer quality since the main stresses in the bulb edges of the lehr end incurred in the attenuating process relax upon severing the bulb edge. The second edge removal, accordingly, is then made in an area of the glass having less stress, so the resultant edge has very few defects. By "running" the score to open and sever the glass instead of "snapping" the score, the resultant second edge is of a very fine or mirror quality.

In order to provide such a fine edge in a lehr end which is advancing along a main line of a modern float glass plant, it is necessary that the bulb edge severing apparatus be easily moved into position, adjusted and maintained without stopping the flow of glass sheets. Accordingly, a pair of apparatus of the instant invention are attached to frame members on either side of the advancing glass sheets. The apparatus are mounted so as to each be slideably and selectively movable along a pair of rails to advance toward or retreat from the glass sheets as required. An air cylinder controls the positioning of the apparatus along the rails. A separate air cylinder provides the opening movement of both upper and lower mandrels through the use of mechanical linkage.

Since the peeling or running motion was modeled after hand cutting practices used on thicker glass, it is necessary to provide a double peeling action. The two mandrels which twist about the score line are thus tilted slightly away from the horizontal plane of the major glass surfaces in that the upper mandrel is tilted slightly upward and the lower mandrel is tilted slightly downward. Thus, when the two mandrels engage the glass it is only at the trailing end corners of the sheet that the glass is contacted. The torque induced by the movement of the mandrels propagates the previously applied score and opens the score in a manner similar to that employed by hand cutting in which pliers or manual opening methods are employed.

The use of the dual mandrels in the apparatus necessitates the use of an actuating mechanism such as a power cylinder. Although two or more power cylinders could be employed, the invention does provide that the actuation can be accomplished by a single power cylinder and that the movement of the mandrels is accomplished by the use of a mechanical linkage having a variety of adjustments.

It has been found that the raising of the lower mandrel in an arcuate path does not produce as fine a cut edge as if the mandrel were raised substantially normal to the major glass plane, thus the mechanical linkage of the invention is further enhanced by a pantograph type of parallelogram linkage which compensates for the arcuate movement of the lower mandrel to alter the movement of the lower mandrel to that of a vertical one. Since glass to metal contact does not provide sufficient friction between the materials and induces uncontrolled stresses which damage the glass edges, both mandrels are covered with a slightly resilient, high friction coefficient material such as rubber.

In an automated wareroom, the cutters and conveyors are computer controlled and many machines rely upon air power cylinders in such plants. The use of air cylinders in the instant invention further enhances the adaptability of the invention to the computer controlled wareroom environment in that the apparatus is easily computer controlled and attached to existing air power supplies.

It has been found in hand cutting and in the opening of scores in glass material in general that a better edge can be obtained by running or opening the score from a direction opposite to the direction the score was induced in the glass. Accordingly, the apparatus of the instant invention is installed so that it contacts the trailing edge of the advancing lehr ends rather than their leading end. The scores are imposed by use of a fixed cutting bridge in which the scores are necessarily imposed upon the lehr ends from the leading end toward the trailing end. It has been found that by the use of one or more additionaly scoring wheels attached to the apparatus upstream from the mandrels of the instant invention that score lines may be imposed separately from the normal scoring bridges.

In summary, the apparatus of the instant invention is directed to the automated removal of bulb edges of glass sheets, particularly lehr ends, so as to produce a fine cut edge without chips, sprawls, hackle, flare or bevel, by the use of a pair of simultaneously moving mandrels imposing a torque on the trailing end of a previously applied score line. The method of using the apparatus for severing the edges of a glass sheet include the steps of scoring a line substantially parallel to the bulb edge to be removed, and applying a torque to the trailing end in order to open and run the cut to sever the sheet. Additional steps of providing a second score inboard and parallel to the first score and applying a torque to the trailing end about the second score are also contemplated within the scope of the invention.

In order that the invention may be more clearly understood, there are the preferred embodiments of the invention which will now be described in reference to the accompanying drawings.

BRIEF DESCRIPTION OF THE DRAWINGS

FIG. 1 is a top plan view of a single station for removing the bulb edge on a glass sheet advancing along a conveyor showing the mandrels in position about a previously applied score line in accordance with the teachings of the invention.

FIG. 2 is a fragmented front elevational view of the parallelogram linkage of the bottom mandrel with portions removed for purposes of clarity.

FIG. 4 is a fragmented end elevational view of the trailing edge of a lehr end in which the torque applying mandrels are shown in position relative to the lehr end bulb edge, a conveyor roll, and each other.

FIG. 5 is a fragmented side elevational view similar to FIG. 4 in which the relative movement of the mandrels during the torque applying steps are depicted.

FIG. 6 is a fragmented side elevational view similar to FIG. 4 depicting the relative position of the torque applying mandrels in severing the second strip from the lehr end.

FIG. 7 is a fragmented side elevational view similar to FIG. 5 in which the relative movement of the mandrels is depicted while severing the second strip from the lehr end.

FIG. 8 is a fragmented side elevational view in which the mandrels are depicted tilted at a greatly exaggerated angle to show that the mandrels contact the upper and lower edges of the trailing end of the glass sheet wherein the lehr end glass sheet is viewed from a position substantially normal to the position of the lehr end depicted in FIGS. 1, 2, 3 and 4. Portions of the apparatus are removed for clarity.

DESCRIPTION OF THE PREFERRED EMBODIMENT

Figure 3:
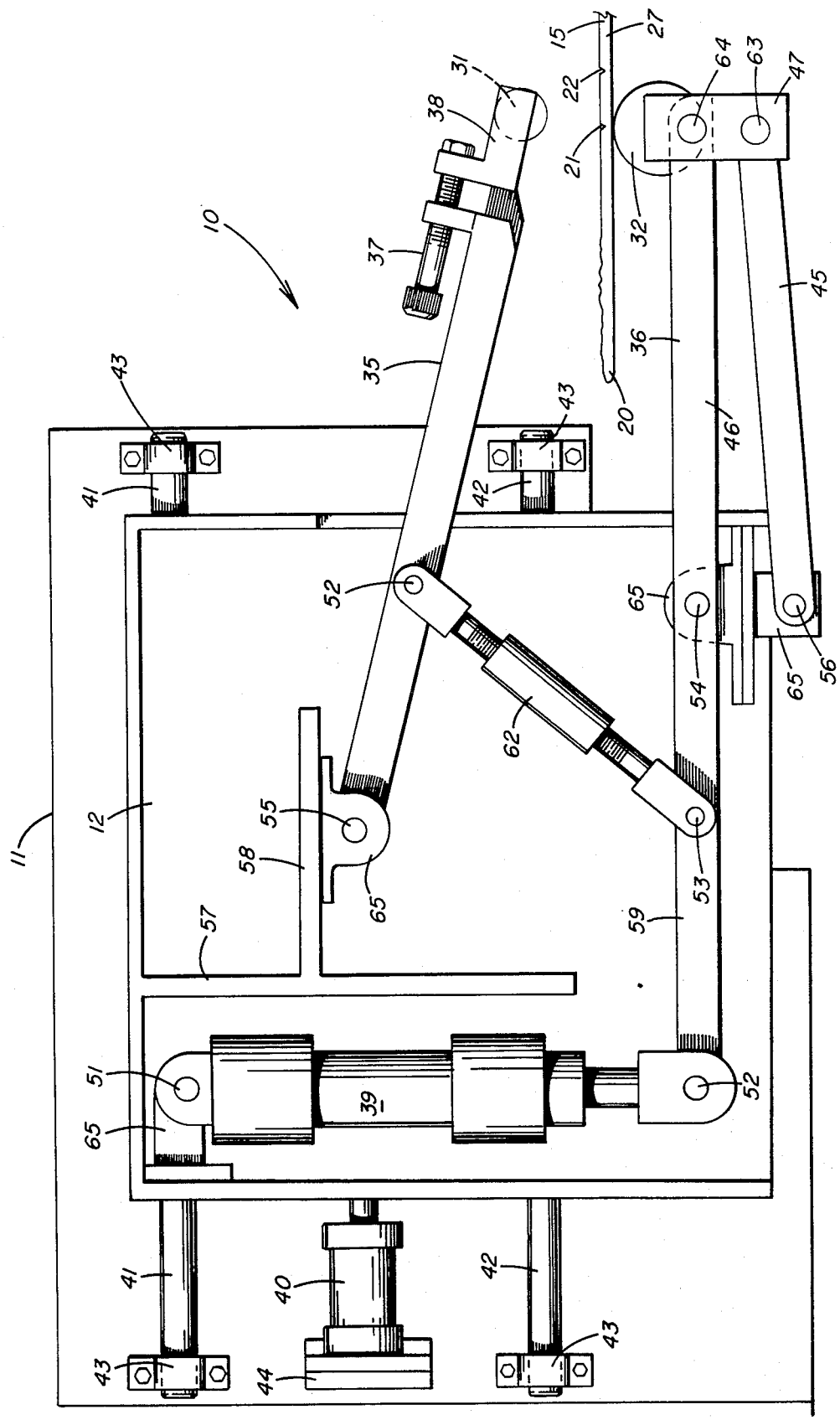
FIG. 3 is a front elevational view of the apparatus showing a fragmented trailing end view of a lehr end having an unsevered bulb edge.

The apparatus 10 is shown generally in FIG. 1 attached to a horizontal conveyor 13. The horizontal conveyor 13 is of the type generally known in the art as having a frame 14, and powered conveyor rolls 16 which are attached to conveyor roll axles 17. Conveyor roll axles 17 are mechanically driven and computer controlled so that horizontal sheets placed upon the array of rolls attached at intervals on the axles 17 provide for the movement and stoppage of articles along the conveyor 13. As can be seen from FIG. 1, large sheets of glass 15 are depicted being conveyed from left to right. The sheets of glass had previously been severed from a ribbon of glass emerging from the cold end of an annealing lehr (not shown). These large sheets of glass 15, also known as lehr ends, or caps, are as wide as the ribbon width. The width of the caps therefore, are approximately 12 feet (3.66 meters) wide, however they may be larger or smaller depending upon the width of the ribbon emerging from the cold end of the annealing lehr. The lehr ends also may be of differing lengths, however, they are generally longer than they are wide. Lateral scoring or cross-scoring equipment (not shown) imposes a lateral or cross-score in the ribbon which is then opened to sever the ribbon into the lehr ends 15. An example of the cross-cutting (lateral scoring) and subsequent opening is taught in general in U.S. Pat. No. 4,285,451 which teachings are hereby incorporated by reference.

With reference to FIG. 1, it can be seen that the direction of travel of the lehr ends are from left to right. As the lehr ends are so transvering the conveyor, one or more scores are imposed in the lehr end along the lateral edge. These scores may also be imposed prior to sectioning of the ribbon into lehr ends. A first score 21 and a second score 22 are depicted in FIG. 1 on a lehr end 15. Scoring techniques and apparatus that may be used in the practice of the invention, but not limiting thereto, are taught in U.S. Pat. Nos. 3,244,337; 3,800,991; 3,865,293; 3,865,294 and 4,057,184 which teachings are hereby incorporated by reference.

As the purpose of the instant invention is to remove the bulb edge and provide a clean, pristine edge on the lateral sides of the lehr end 15, the invention must provide for removal of the bulb edge 20 and cut edge section 26 (if a double cut is made). Thus, the apparatus 10 is attached to conveyor frame 14 on the lateral side of the conveyor. While only one apparatus 10 is depicted in FIG. 1, operating on the left side of the conveyor as facing the direction of glass movement, an additional apparatus 10 may be placed on the opposite side of the conveyor 14 thus providing for near simultaneous removal of the bulb edge 20 and cut edge strip 21 on both lateral sides of the lehr end 15.

Conveyor 13 as is generally known, is of a type which may be stopped and started as necessary to convey the glass to a predetermined position. At times the glass movement is stopped so that operations may be performed upon the glass or that it is in a holding position awaiting further cutting or handling downstream. As the conveyor drive is controlled by an information processing unit (computer) programmed to stop and start the conveyor, the lehr ends 15 may be positioned with the trailing end 27 of lehr end 15 within a certain tolerance range next to apparatus 10. It has been found that without modification, present conveyors will stop the trailing end at a point within ±5 inches (12.7 cm) regardless of the size of lehr end 15.

It can be seen by reference to FIG. 1 that when the bulb edge is removed by apparatus 10, the bulb edge falling by its own weight will land in a receptacle or cullet chute 18 to be returned to the melting furnace or disposed of in a conventional manner.

With reference to FIG. 3, the right side elevational view of the apparatus 10 is depicted as if looking at apparatus 10 while facing in the direction of glass flow. The apparatus 10 is generally provided with a pair of mandrels 31 and 32 which twist about trailing end 27 of lehr end 15 in the vicinity of bulb edge score 21 to open score 21 by running the score from the trailing edge 27 of lehr end 15. Upper mandrel 31 is a cylinder lying generally in the plane of the major surfaces of lehr end 15, but having a slight incline to the plane of lehr end 15 in that the upper mandrel 31 is positioned slightly lower toward trailing edge 27 of lehr end 15 and slightly higher as it proceeds along a longitudinal axis of upper mandrel 31. The inclination of mandrel 31 from being parallel to the plane of lehr end 15 is depicted in greatly exaggerated form in FIG. 8.

Lower mandrel 32 as depicted in FIG. 3 is of a similar construction to upper mandrel 31; however, it has been found that the best results are obtained if lower mandrel 32 is of a slightly larger diameter than upper mandrel 31. This preferred size relationship is depicted in FIG. 3. Nevertheless, it should be understood that lower mandrel 32 could be of a smaller diameter than upper mandrel 31 as depicted in FIGS. 4, 5, 6, 7 and 8 and satisfactory results would be obtained and still not depart from the teachings of this invention.

Lower mandrel 32 is also slightly inclined to the major plane of lehr end 15 with the most rearward portion of the longitudinal axis of lower mandrel 32 slightly raised with respect to the position of the most foreward part of the longitudinal axis of lower mandrel 32 as depicted in greatly exaggerated form in FIG. 8. The angle of upward slope 49 for upper mandrel 31 and the angle of downward slope 50 of mandrel 32 as shown in FIG. 8, has been found to yield satisfactory results when both angles 49 and 50 are in the vicinity of 1° from horizontal. It is to be understood that other angles of incidence 49 and 50 could be used without departing from the scope of the invention.

Returning now to FIG. 3, where it can be seen that one end of cylindrical, upper mandrel 31 is attached to slidable member 38 and upper elongated rod 35 which is, in turn, pivotally attached to frame member 12 at horizontal frame wall 58 by use of blocks 65 and journal 55. As elongated arm 35 moves about journal 55, upper mandrel 31 moves in an arcuate path and approaches the major plane of lehr end 15 in a downward an outward motion. Whan mandrel 31 is rotated from the raised position to the lowered position about journal 55, upper mandrel 31 moves down toward lower mandrel 32 and also outward toward bulb edge 20. Thus, as shown in FIG. 8, when in contact with lehr end 15 at trailing end 27 at upper edge corner 60 the movement of upper mandrel 31 acts to push down upon bulb edge 20 also urging bulb edge 20 from lehr end 15, thus opening score 21 to sever bulb edge 20 from lehr end 15.

In order to actuate upper elongated rod 35, longitudinal turnbuckle 62 is provided to attach elongated rod 35 between pivotal point 52 and pivotal point 53 located on elongated rod 46. Elongated rod 46 is pivotally attached at block 65 by use of journal 54. The leftmost end of lower elongated rod 46 is attached to actuating cylinder 39 at pivotal point 52. Actuating cylinder 39 is attached also at pivotal point 51 by use of blocks 65 attached to frame 12. Thus, it can be seen from FIG. 3 that when actuating cylinder 39 is extended, pivoting journal 52 is moved downward in turn pivoting about journal 54, hence the rearward portion of elongated member 46 is urged upward along elongated rod 35 in a downward arcing movement by use of turnbuckle 62. It can be further seen that by shortening the length of turnbuckle 62 or by increasing the length of turnbuckle 62, the position of upper mandrel 31 can be raised or lowered. Elongated rod 36 having rear portion 59 and forward portion 46 pivots about journal 54. When power cylinder 39 is actuated, journal 52 is lowered, thus pivoting elongated rod 36 about journal 54 and block 65 attached to frame 12, in turn causing pivotal end 64 of elongated rod 36 to rise. The movement of pivotal point 64 is an arcuate path about journal 54. If lower mandrel 32 were directly attached to elongated rod 36, lower mandrel 32 would move in an arc toward upper mandrel 31 thus pinching glass 15 therebetween. Since the pinching of the glass would not provide for proper score opening, additional linkage is provided to cause lower mandrel 32 to not move in an arcuate path, but rather to move in an upward direction substantially normal to the major plane of lehr end 15. In order to provide for the best opening of score line 21 or 22, it has also been found that lower mandrel 32 must contact the corner 61 of lower surface 24 and trailing end 27 at a point directly beneath the score line. While lehr end 15 is raised as depicted in FIGS. 5 and 7, lower mandrel 32 will continue to contact the glass directly beneath the score line if the movement of lower mandrel 32 is substantially upward and not arcuate.

To avoid pinching and to place lower mandrel 32 directly under the score, an additional linkage is provided by vertical link 47 pivotally attached to journal point 64. By attaching vertical link 47 to pantograph lower arm 45 which is in turn pivotally attached to frame 12 by use of journal 56 and blocks 65 provides that as pivotal point 64 of arm 46 moves in an arcuate upward path, journal point 63 is rotated about journal point 64 in an equal and opposite manner. Lower mandrel 32 which is attached to vertical member 47 at lower mandrel attachment point 38 slightly above pivot point 64 as shown in FIG. 2, causes the lower mandrel 32 to rise substantially upward and normal to glass plane 15. The movement of mandrel 31 and 32 thus are not together in a pinching manner, but rather contact the glass in a peeling twisting manner to open score 21 and provide separation of bulb edge 20 from lehr end 15.

Referring now to FIG. 3, it can be seen now that actuating cylinder 39, upper elongated arm 35, lower elongated arm 36, block 65, pantograph arms 45 and 47, and the associated mandrels 31 and 32 are all attached to frame 12. Frame 12 is a box structure having an exterior wall, interior vertical wall 57 and interior horizontal wall 58. Frame member 12 is slidably attached along rods 41 and 42 which are in turn attached by use of brackets 43 to main frame 11. It can thus be seen that frame 12 can be slid along rods 41 and 42 from side to side as shown in FIG. 3, thus in turn positioning mandrels 31 and 32 from right to left about lehr end 15. In order to accomplish the sliding of frame 12 and associated mechanical linkages, power cylinder 40 is provided. Power cylinder 40 is attached between main frame 11 and slidable frame 12.

It has been found that power cylinder 40 can be attached to the forward portion of frame 12 and the arrangement allows for an additional power cylinder to be attached in line so that two cylinders in tandem allow greater control in the computerized operation of apparatus 10 by having the cylinders operate independently as well as in conjunction with one another. Power cylinders 39 and 40 are of the air cylinder type; however, hydraulic power cylinders, electric ball screw actuators, electric motors or other power cylinders may be employed without departure from the teaching of the invention.

It can be seen from FIG. 3 that once the bulb edge 20 has been removed by the twisting action of mandrels 31 and 32 about score 21 that by sliding frame 12 toward score line 22 that the second edge strip 26 may be removed in a like manner. The positioning of lower mandrel 32 relative to score lines 21 and 22 can be accomplished by the use of actuating cylinder 40 or may be accomplished by screw type adjustment means 44 which advances power cylinder 40 and frame 12 and is attached between power cylinder 40 and frame 11.

Upper breaker arm 35 is further provided with a fine adjustment 37 which allows for adjusting the position of upper mandrel 31 relative to lower mandrel 32. This adjustment effectively lengthens or shortens breaker rod 35 to obtain the proper contact on the glass. Upper mandrel 31 and lower mandrel 32 are bolted to slidable member 38 and vertical pantograph link 47 respectively. Vertical link 47 could also be provided with an adjustment slot (not shown) which would allow a fine adjustment of the movement of lower mandrel 32 to insure that lower mandrel is urged upward substantially normal to the lehr end 15 when power cylinder 39 is atcuated.

Upper mandrels 31 and lower mandrels 32 do not pivot or revolve about their attachment points. Furthermore, upper mandrel 31 and lower mandrel 32 are provided with a nonslip coating or sleeve 33 and 34, respectively, as shown in FIGS. 4, 5, 6 and 7. Coating 33 and 34 could be of rubber, nylon, or other appropriate surface which provides the necessary friction and yet avoids metal to glass contact. It has been found that if the uppermost contact point of lower mandrel 32 becomes worn so that a flat spot or abrasion develops on coating 34 that the mandrel 32 may be loosened and slightly rotated and when retightened so as to provide a curved glass to mandrel contact surface. In a like manner, upper mandrel 31 is loosened, rotated and retightened to provide a single tangential contact point.

The operation of the invention will now be described in reference to FIGS. 4, 5, 6 and 7. In FIG. 4, it can be seen that lehr end 15 having score lines 21 and 22 and the upper surface 23 is conveyed along a series of rolls 16. When rolls 16 are halted, lehr end 15 is placed in a position so that trailing edge 27 of lehr end 15 is somewhere between the contact surfaces 33 and 34 of upper mandrel 31 and 32, respectively. This can best be seen by reference to FIG. 8. The apparatus 10 will remove the bulb edge 20 unless trailing end 27 stops beyond the lengths of upper mandrel 31 and lower mandrel 32.

Once the lehr end 15 is in position as shown in FIGS. 4 and 8, power cylinder 40 is actuated to position lower mandrel 32 directly beneath score line 21. Power cylinder 39 is then actuated thus raising lower mandrel 32 in a manner previously discussed while moving upper mandrel 31 in a downward and outward direction. The glass is thus gripped on the corner edge of the trailing end 27 in a twisting relationship. In FIG. 5, it can be seen that lower mandrel 32 actually raises the lower surface of the glass 24 off roll 16 by an amount approximating ½ inch (1.27 cm). The distance 19 that the lower surface 24 is raised off roll 16 is shown in FIGS. 5 and 7.

As the lower mandrel 32 rises substantially vertically and normal to the major plane of the glass 15, upper mandrel 31 is moved in an arcuate path downward and outward toward bulb edge 20. When contact is made as shown in FIG. 5, score line 21 is opened from the trailing end 27 of the glass to the leading end of the glass, thus providing a clean lateral edge 29. By so removing bulb edge 20, imperfections 25 caused by the ribbon forming process as well as edge stresses produced in the formation of the glass are removed. While it is not necessary to make additional scores or remove additional portions of the edge, it has been found that once such stresses and imperfections have been removed by removing the first bulb edge, a second previously applied score may be opened which provides an even finer finished edge. Such a result is taught in U.S. Pat. No. 4,285,451, however the instant invention allows for opening the second score without having scores of differeing pressures or depths. Apparatus 10 provides a moving frame 12 to allow for a second edge portion to be removed.

With reference to FIG. 6, it can be seen that after bulb edge 20 has been removed, lower mandrel 32 is advanced toward conveyor roll 16 and positioned directly under score line 22. The positioning of the lower mandrel 32 is accomplished by extending power cylinder 40 in a lateral manner. Once lower mandrel 32 is positioned under score 22, power cylinder 39 is actuated thus raising the lower mandrel 32 by gap distance 19 off roll 16 as shown in FIG. 7 and upper mandrel 31 is moved in a downwardly and outwardly direction, thus opening and severing edge portion 26 from lehr end 15 and providing pristine edge 30. As in previous bulb edge removal, power cylinder 39 is de-energized and returns lower mandrel 32 below the upper plan surface of roll 16 as well as returning mandrel 31 above the upper surface 23 of lehr end 15 thus allowing lehr end 15 to lie along horizontal conveyor 13 and be conveyed to additional cutting and/or packaging or storing operations.

While it is contemplated that the invention is best utilized with glass thicknesses of 5 mm and thicker, it is understood that apparatus 10 will provide the satisfactory edge in thinner glass sheets; however, with thin glass sheets, ordinary snapping means have been found to provide greater speed of bulb edge removal. In making thicker glass by the float process, the glass ribbon moves at a slower rate, as the thickness of the glass increases. Thus, the manufacture of thicker glass allows more time for the operation of bulb edge removal. The preferred embodiment, while providing pristine edges on lehr ends requires an operating recycling time of approximately 4 to 5 seconds to make the two severing cycles. By using different component parts, it is contemplated that this recycling time may be varied. While score lines 21 and 22 have been described as having been previously placed upon lehr end 15 at a conventional cutting bridge, it is also within the scope of the invention to provide one or more cutting heads attached to frame 12 upstream of the invention to provide for scoring near the site of the apparatus 10. When such remote scoring heads are utilized, they can thus be positioned by use of actuating cylinder 40 if they are attached to frame 12.

When the invention is not in use, such as when bulb edges are removed by conventional snapping on thin glass sheets, as previously discussed, it can readily be seen that by retracting power cylinder 40, inner frame 21 and the associated mechanism can be removed from the vicinity of the bulb edge thus making apparatus 10 inobtrusive. Additionally, apparatus 10, by being capable of being removed from the main line conveyor without disturbing the flow of glass allows for ease in maintenance and flexibility of control.

As can now be appreciated from the foregoing description of the preferred embodiments, the invention is not limited to the above example which was presented for illustration purposes only. It is understood that other steps, examples, components and method of operation will occur to those skilled in the art from a thorough reading of this disclosure without departing from the scope of the invention as claimed hereafter.

We claim:

1. An apparatus for severing the edges of glass sheets, said sheets of a type having an upper surface, a lower surface, a trailing edge, a leading edge, and a score line imposed upon said upper surface running between said leading edge and said trailing edge, the apparatus comprising:

a. a lower mandrel means disposed beneath said lower surface for engaging said glass sheet beneath said score line and raising said trailing edge of said glass sheet; and
   b. an upper mandrel means disposed above said upper surface for engaging the upper trailing edge of said glass sheet and applying a downward and outward force against said sheet.

2. The apparatus as described in claim 1, wherein said upper mandrel means is comprised of a first frame means, an upper linkage means pivotally attached to said first frame means an upper glass contact means attached to said upper linkage means, and an actuating means functionally connected to said upper linkage means.

3. The apparatus as described in claim 2, wherein said upper glass contact means is comprised of a substantially cylindrical rod.

4. The apparatus as described in claim 3 further comprising a resilient glass contact surface attached to said cylindrical rod.

5. The apparatus as described in claim 3, wherein said upper linkage means is comprised of a first elongate member having a first end and a second end, wherein said first end if attached to said substantially cylindrical rod and said second end is pivotally attached to said first frame means.

6. The apparatus as described in claim 5 wherein said actuating means is comprised of a second elongate member attached between said first end and said second end of said linkage means, said second elongate member operably attached to a power means.

7. The apparatus as described in claim 5 further comprising upper mandrel adjustment means attached between said first elongate member and said cylindrical rod.

8. The apparatus as described in claim 1, wherein said lower mandrel means is comprised of a first frame means, a lower linkage means pivotally attached to said first frame means, an actuating means operatively connected to said lower linkage means, and a lower glass contact means attached to said lower linkage means.

9. The apparatus as described in claim 8, wherein said lower linkage means is comprised of a lower elongate member having a first end and a second end, wherein said first end is attached to a pantograph linkage means for directing said lower mandrel means substantially normal to said lower surface of said glass sheet, wherein said pantograph linkage means is attached to said lower glass contact means; and wherein said second end of said lower elongate member is functionally connected to said actuating means, and wherein further said lower elongate member is pivotally attached to said first frame means between said first end and said second end of said lower elongate member.

10. The apparatus as described in claim 9, wherein said actuating means is a power cylinder functionally connected to said first end of said open brackets third lower elongate member.

11. The apparatus as described in claim 10, wherein said pantograph linkage means is comprised of a mediate elongate member having a first end and a second end, a vertical link having an upper end and a lower end, wherein said lower end of said vertical link is pivotally attached to said second end of said mediate elongate member, and wherein said first end of said mediate elongate member is pivotally attached to said first frame means, and wherein said upper end of said vertical link is attached to said lower glass contact means, and wherein said vertical link is pivotally attached to the first end of said lower elongate member between said upper end and said lower end of said vertical link.

12. The apparatus as described in claim 2 or 8, further comprising a second frame means disposed adjacent to said glass sheet, wherein said first frame means is slidably attached to said second frame means for slidably moving said first frame means relative to said glass sheet.

13. The apparatus as described in claim 12, further comprising a frame adjustment means attached between said first and said second frame means for adjusting the relative movement between said first frame means and second frame means.

14. The apparatus as described in claim 13, further comprising a first power actuating means interconnecting said first frame means and said second frame means for, moving said first frame means relative to said glass sheet.

15. The apparatus as described in claim 14 further comprising a second power actuating means attached between said first power actuating means and said first frame means.

16. The apparatus of claim 1, further comprising means for indexing said upper mandrel means and said lower mandrel means into relative functional alignment with an innermost score line imposed upon said upper surface inwardly and proximal to said upper score line.

17. The apparatus of claim 1 or 16, wherein said upper mandrel means is angularly disposed above said upper surface for contacting and applying a downward and outward force against said trailing edge of said score line at a single, tangential contact point.

18. The apparatus of claim 17, wherein said lower mandrel means is angularly disposed beneath said lower surface for contacting and applying an upwardly directed force against said trailing edge of said score line at a single tangential contact point.

19. The apparatus of claim 18, wherein said lower mandrel means is adapted for vertically upward movement in a plane at least substantially normal to said lower surface for raising said trailing edge.

20. A method of severing the edges of glass sheets, said sheets of a type having an upper surface, a lower surface, a trailing end, a leading end and a score line imposed upon said upper surface, said method comprising the steps of:
   a. providing a lower mandrel means for engaging said trailing end of said glass sheet beneath said score line;
   b. raising said glass sheet by raising said lower mandrel means;
   c. providing an upper mandrel means for engaging the upper trailing edge of said sheet; and
   d. applying a downward and outward force against said glass sheet by contact with said upper mandrel means.

21. A method of severing the edge of a glass sheet comprising the steps of: p1 a. applying a score having a leading end and a trailing end along said sheet; p1 b. applying a mechanical torque at the trailing end of said score line with an upward moving lower mandrel and a downward and outward moving upper mandrel; and
   c. allowing said score line to open from said trailing end to said leading end.

22. A method as described in claim 20 or 21, further comprising the step of applying a second score line having a leading end and a trailing end and applying a mechanical torque to said second score line and allowing said second score line to open from said trailing end to said leading end.

* * * * *

UNITED STATES PATENT AND TRADEMARK OFFICE
CERTIFICATE OF CORRECTION

PATENT NO. : 4,489,870

DATED : December 25, 1984

INVENTOR(S) : Bernard H. Prange, Dale J. Helenschmidt

It is certified that error appears in the above-identified patent and that said Letters Patent is hereby corrected as shown below:

Column 10, line 58, delete "open brackets third"

Column 12, line 24, delete "pl" and indent a. beginning on next line.

Column 12, line 25, delete "pl" and indent b. beginning on next line.

Signed and Sealed this

Twenty-fourth Day of September 1985

[SEAL]

Attest:

DONALD J. QUIGG

Attesting Officer

Commissioner of Patents and
Trademarks—Designate